United States Patent [19]
Tanno

[11] 3,884,565
[45] May 20, 1975

[54] SYNCHRONIZING DEVICE FOR PICTURE-STORY SHOW AND CARTRIDGE TAPE PLAYER

[75] Inventor: Yuji Tanno, Tokyo, Japan

[73] Assignee: ABE Engineering & Development Co. Ltd., Japan

[22] Filed: June 15, 1973

[21] Appl. No.: 370,410

[30] Foreign Application Priority Data

July 18, 1972 Japan .............................. 47-71301

[52] U.S. Cl. ..................... 353/15; 353/120; 35/35 C
[51] Int. Cl. ........................................... G03b 31/06
[58] Field of Search .............................. 353/15–19; 35/35 C

[56] References Cited

UNITED STATES PATENTS

| | | | |
|---|---|---|---|
| 3,086,297 | 4/1963 | Kay | 35/35 C |
| 3,397,467 | 8/1968 | Gemin | 35/35 C |
| 3,516,175 | 6/1970 | Kobler | 35/35 C |
| 3,684,840 | 8/1972 | Ban | 35/35 C |
| 3,685,892 | 8/1972 | Louis | 353/19 |
| 3,748,748 | 7/1973 | Bevan | 35/35 C |

OTHER PUBLICATIONS

"Teaching Machine," IBM Tech. Dis. Bull., Vol. 7, No. 1, June 1964, p. 25, L. S. Weston.

*Primary Examiner*—Richard E. Aegerter
*Assistant Examiner*—A. J. Mirabito
*Attorney, Agent, or Firm*—Otto John Munz

[57] ABSTRACT

A synchronizing device for a picture-story display means and a cartridge tape player to display a series of picture boards one by one in the order of the aural program of story as played from a tape, in which said synchronizing device comprises: a cartridge tape which is provided with a plurality of record tracks; a vertically movable support plate which correctly holds a playback head against said record tracks and a vertically adjustable support leg; a series of picture boards which are held within a picture casing and the lower corners of which are provided with corner cuts each having a different depth; and a guide member which has a stopper at one end and a plurality of steps receiving the lower end of said support leg, the sliding motion of said guide member being stopped by the contact between said stopper and one stopper surface of said corner cuts, and said playback head being guided by each sliding motion of said guide member through said support plate against the record tracks of said cartridge tape.

5 Claims, 5 Drawing Figures

SYNCHRONIZING DEVICE FOR PICTURE-STORY SHOW AND CARTRIDGE TAPE PLAYER

BACKGROUND OF THE INVENTION

1. Field of the Invention

This invention relates to a synchronizing device for a picture-story show and a carriage tape player. More particularly, the invention relates to such synchronizing device in which the audible component from a cartridge tape player is produced synchronously with the display of the visible component of each picture-board scene. By using the synchronizing device of the present invention, words, speeches, comments, background sounds and so forth can be reproduced in synchronism with each scene of the picture-story show. Therefore, an excellent realistic effect can be expected during the picture-story show.

2. Description of the Prior Art

In a movie or television broadcast, each scene and its sounds are correctly synchronized with each other. However, in the picture-board show using picture boards, the synchronization of each separate board with its corresponding sounds has been neither practised nor considered heretofore. Thus, the synchronizing device for the picture board show of the present invention is quite novel one without any precedent.

SUMMARY OF THE INVENTION

The picture-board show is such that a picture-story storyteller shows an audience a series of pictures one by one, representing a story, and the teller explains the pictures to the audience, sometimes with assumed voices and sounds. Therefore, the same story may be expressed in varying degree of skill according to the story teller, and sometimes one can attract the attention of an audience and another sometimes loses their interest.

In the present invention, in order to arouse the interest of an audience to the picture-story show in like manner as or better than movies or television, a record and playback device for the teller's voice as well as for background sound and music is connected to the picture-story show device. This combination of pictures and sounds has been the most difficult problem to be solved in the prior art, and has been now solved through the device of the present invention.

The principal object of the present invention is to provide a synchronizing device for a picture-story show and a cartridge tape player, in which the conventional display system of the picture-story show is improved by producing voices and sounds with true fidelity which correspond to each picture as shown, whereby the display effect can be very much improved.

Another object of the present invention is to provide a synchronizing device for a picture-story show and a cartridge tape player, in which a playback head for reproducing a recorded tape is always held vertically in a stable condition, and a support plate for the playback head is provided for accurately guiding the head against the proper record track of the recorded tape in each operation of drawing a picture board out of a picture casing.

A further object of the present invention is to provide a synchronizing device for a picture-story show and a cartridge tape player having improved picture boards and a guide member, in which the record track of cartridge tape, the picture board and the guide member are completely synchronized, and the playback head is accurately moved to the record track of the cartridge tape by means of a support plate and a support leg on each drawing operation of the picture board.

Still a further object of the present invention is to provide a synchronizing device for a picture-story show and a cartridge tape player having as a novel mechanism, a guide member and a support leg, in which the support leg of the support plate is smoothly moved up and down along the steps of the guide member when each picture board is drawn out in the order of the story, when any desired picture is displayed again after the show, or when the set of pictures is being inserted into the picture casing.

Accordingly, the synchronizing device for a picture-story show and for a cartridge tape player in the present invention comprises a cartridge tape having recorded tracks of voices and sounds for respective story scenes in the order of the story represented by the order of the picture boards; a support plate having a support leg which stably and vertically supports and slides a playback head so as to allow the head to face against each record track of the cartridge tape; a series of picture boards contained in a display casing in the order of the story and provided with corner cuts of different depths in order of the drawing-out operation; and a stepped guide member provided with a stopper which is pushed against a stopper surface of one of the corner cuts of the picture boards, wherein the steps of the guide member correspond to the order of the record tracks receiving the support leg of the support plate.

These and other objects and features of the invention will become more apparent from the following description taken in connection with the accompanying drawings. It should be understood, however, that these are only illustrative of the invention and in no way restrictive of the invention, and other combinations of and variations from the embodiment shown will no doubt occur to those skilled in the art, which are considered to be part of the invention. In the drawings.

Figure 1:
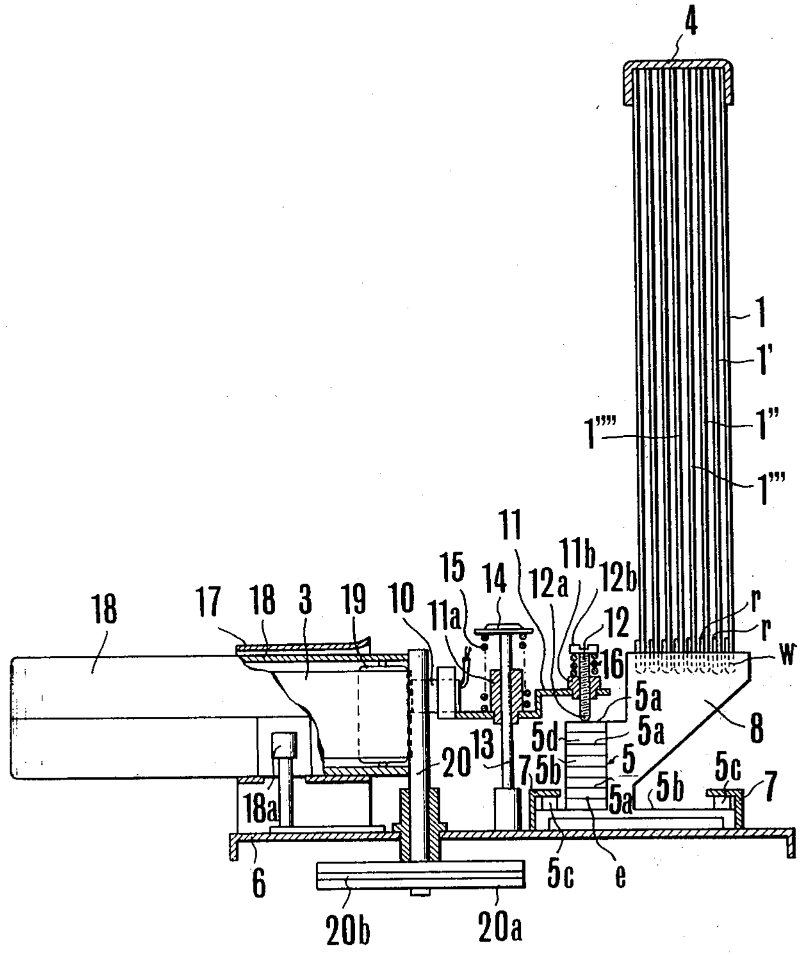
FIG. 1 is a partially cross-sectional side view of a synchronizing device according to the present invention.
Figure 2:
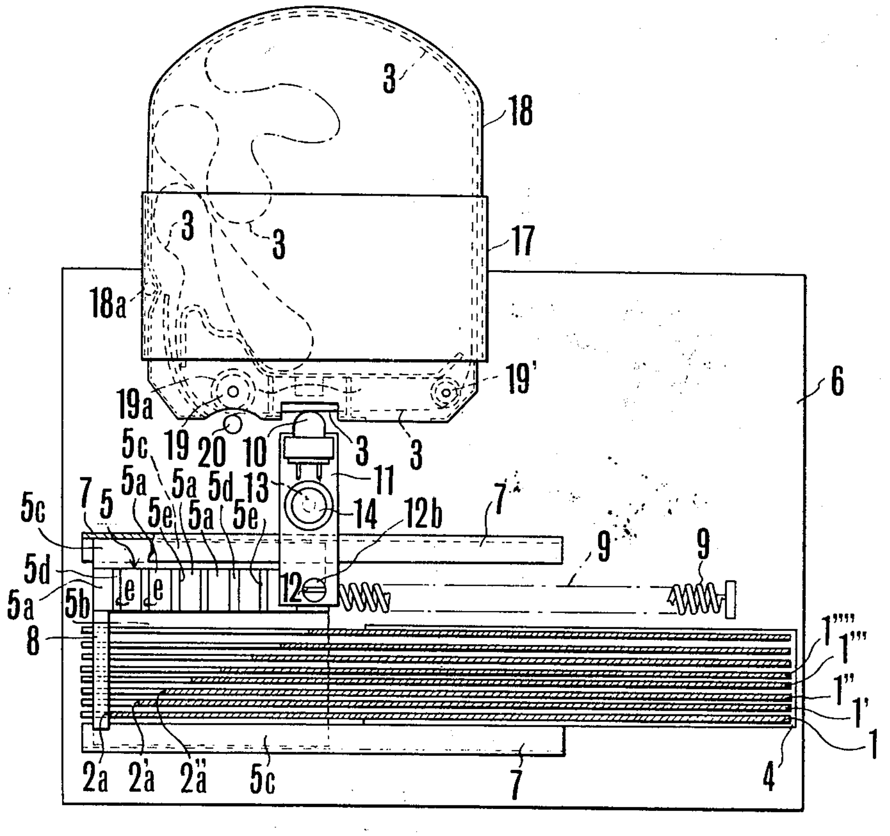
FIG. 2 is a plan view of the synchronizing device in which a portion of cartridge tape is shown.

Referring now to the accompanying drawings, the right hand side of FIG. 1 represents the front of the device as shown, and the bottom of FIG. 2 also represents the front of the device. In the embodiment as shown in the drawings, each scene of a story a is drawn in order on a respective one of eight picture boards 1, 1′, 1″, 1‴ . . . , and one corner of each picture board is formed with a corner cut 2, 2′, 2″, or 2‴ . . . , the size of which becomes larger one by one from the front board 1 to the latter boards 1', 1'', 1''' . . . with an arithmetically progressive difference S, whereby the lateral depths L of the corner cuts become larger in a progression S, 2S, 3S . . . Thus stopper surfaces 2*a*, 2'*a*, 2''*a*, 2'''*a* . . . are formed on the vertical edges of respective cuts 2, 2', 2'', 2' ''. . . Further, the lower corners on the drawing sides of the picture boards are provided with respective check portions *v* of a certain length to be engaged with a portion 6*a* of a bed 6 when the picture boards are inserted within a casing 4. As shown by the dash line in FIG. 5, the board between the stopper surface and the check portion is formed with an elongated foldable portion *r* which is to be folded against the rear side of the picture board and is adhered *w* thereto, whereby the thickness of the portion of the stopper surface can be doubled to resist pressure.

Figure 5:
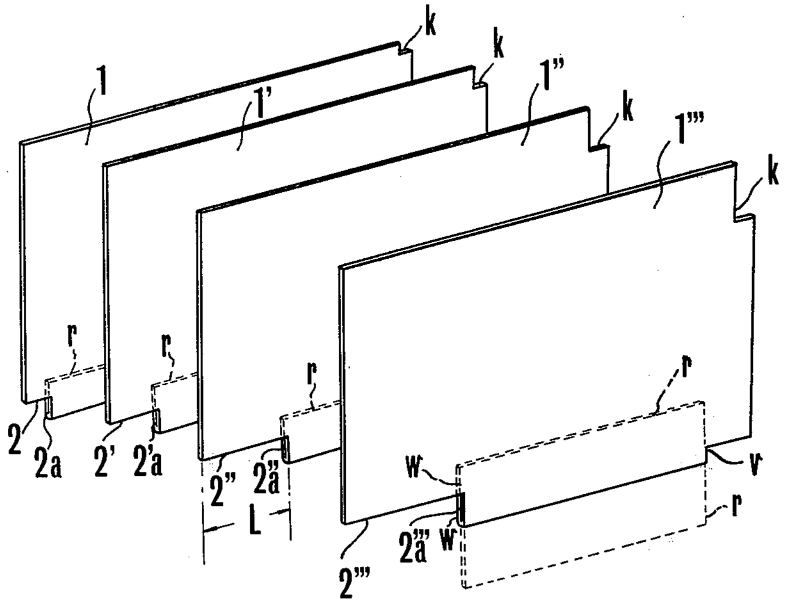
FIG. 5 is a perspective view of picture boards showing their structures.

Record tracks of voices and sounds which correspond to respective scenes of the picture boards are formed on the cartridge tape 3 from upper side to lower side in the order of the pictures of the story. The above-mentioned picture boards are inserted into the picture board casing 4 in the order of the boards 1, 1', 1'', 1''' . . . , and are displayed one by one through a picture window 4*a*. In like manner as the ordinary ones, the insertion and drawing out of the picture boards are carried out through the side face of the casing 4. In order to draw out the picture boards one by one without fail, each picture board is further provided with a cut *k* for drawing out at the upper corner of the drawing side. As shown in FIG. 5, the vertical lengths of the cuts are made larger one by one from the first board to the latter ones.

Figure 3:
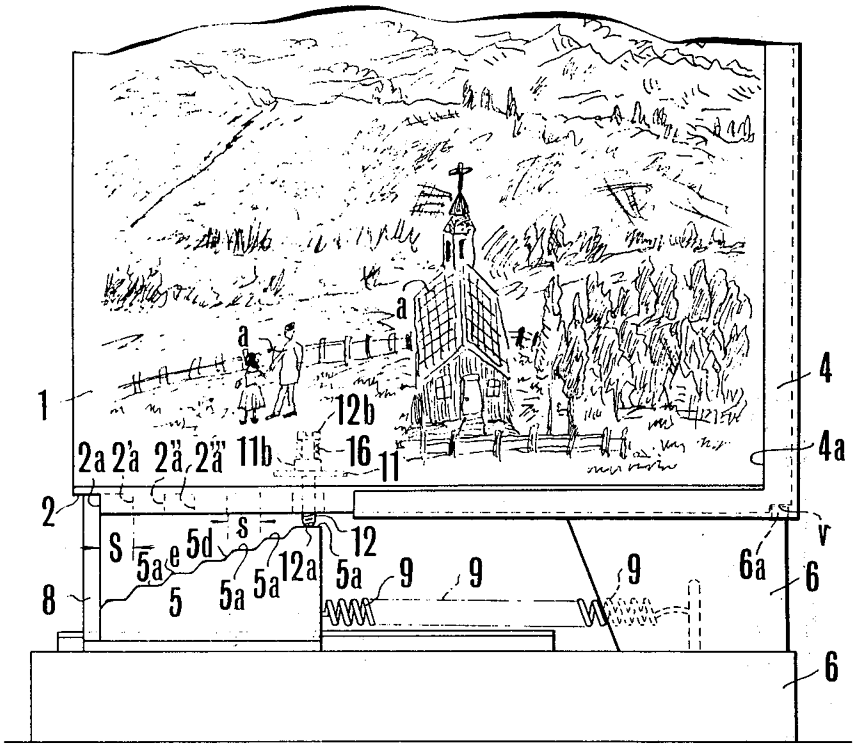
FIG. 3 is a partial front elevation of said synchronizing device in which the relation between a stopper of a guide member and a stopper surface of a picture board, and that between the guide member and a support leg of a support plate when the first picture board being displayed, are shown.

A guide member 5 having a plurality of steps 5*a* (in this embodiment, there are eight steps) is disposed on the rear side of and in parallel with said picture boards, where both rims 5*c* and 5*c* on the bottom plate 5*b* of the guide member 5 are slidably fitted to slider frames 7 attached to said bed 6 so as to be moved in parallel with the layers of picture boards in the casing 4. On the lower step side of this guide member 5, a stopper 8 is vertically erected and has a sufficient height to be engaged with the above-mentioned stopper surfaces 2*a*, 2'*a*, 2''*a*, 2'''*a* . . . of the picture boards 1, 1', 1'', 1''' . . . , A coil spring 9 is provided between the upper step side of said guide member 5 and a post fixed to the bed 6, whereby the guide member 5 is always pulled to the right hand in FIG. 2. Each edge 5*e* of each step 5*a* is provided with a rounded surface *e*. In the condition as shown in FIGS. 2 and 3, the support leg 12 of the support plate 11 which supports a playback head 10 is positioned on the uppermost step 5*a* of the guide member 5, and the lower end of said support leg 12 is rounded to form a sliding surface 12*a*. A sleeve 11a attached to said support plate 11 is placed over a support post 13 in freely slidable manner, and said support post 13 is fixed to the bed 6. A compression spring 15 is provided between an end plate 14 at the upper end of said post 13 and the upper surface of said support plate 11, whereby the support plate 11 is always pushed downwards.

Further, an internally threaded sleeve 11*b* is attached in the front portion of said support plate 11, and said sleeve 11*b* receives an externally threaded support leg 12 which has an adjustment knob 12*b* at its upper end. A coil spring 16 is fitted between said adjustment knob 12*b* and said internally threaded sleeve 11*b*. The lower end of the support leg 12 is, at the start, positioned on the uppermost step 5*a* of the guide member 5. Having the above-mentioned structure and being adjusted by means of said adjusting knob 12*b*, the height of playback head 10 can be always correctly aligned to the proper record track of said cartridge tape 3. Further, said support plate 11 is fitted to the support post 13 and is pushed downwards by the coil spring 15 during the displaying of picture boards. The playback head 10 can be always held vertically in a stable condition.

On the rear side of said support plate 11, the bed 6 is provided with a support frame 17 to receive a casing 18 of the endless cartridge tape 3, where said tape casing 18 can be slid into or out through a guide roller 18a from the rear side of said support frame 17. The endless cartridge tape 3 is held in the free space of the casing 18 in bent or wound condition as is well known in the conventional art, and it is moved along guide rollers 19 and 19' attached to the front corner portions of said casing 18. The guide roller 19 is covered by a rubber belt 19*a* on its peripheral surface, and a capstan bar 20 is provided adjacent to said roller 19 and is rotated on said bed 6. The tape 3 which is exposed from said tape casing 18 is held between the rubber surface 19*a* of the roller 19 and said capstan bar 20 and is automatically shifted by the rotation of the capstan bar 20. A pulley 20*a* is attached to the lower end of said capstan bar 20 and is slowly rotated by a belt 20*b* which is driven by an electric motor fixed under the bed 6. The playback head 10 is allowed to contact the middle portion of the exposed tape 3 from the tape casing 18. The recording and reproducing mechanism used for the device of the present invention is the same as the ordinary known ones. The distance of movement in the vertical direction of the playback head 10 against the record tracks of the cartridge tape 3 is caused to coincide with the difference between the steps 5a of guide member 5, and the difference S of the depths L of the corner cuts 2, 2', 2'' . . . is also caused to coincide with the horizontal pitch of said steps 5*a*. Between the steps 5*a* of the guide member 5, inclined surfaces 5*d* are formed, and the corner edges 5*e* between said inclined surfaces 5*d* and steps 5*a* are rounded to form round surfaces *e*. Also the lowermost end of the support leg 12 is also rounded to form a sliding surface 12*a*. Thereby, the ascent and descent of the support leg 12 can be smoothly carried out. Especially it is convenient to reduce the resistance when the support leg 12 is moved up on the steps 5*a* during the insertion of the picture boards into the picture casing 4. Thus, the shifting of the playback head 10 against the record tracks of the tape 3 can be smoothly and quickly carried out.

Figure 4:
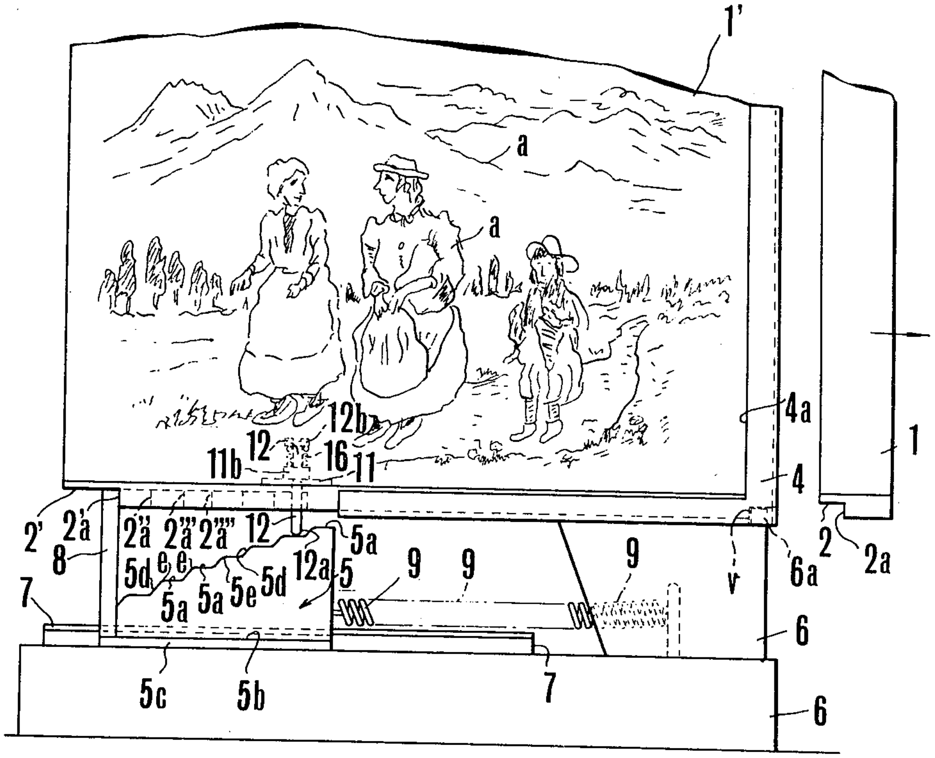
FIG. 4 is a partial front elevation of said synchronizing device in which the relation between said stopper of the guide member and the stopper surface of a picture board, and that between the guide member and the support leg of the support plate when the next picture board being displayed, are shown.

The function of the device of the present invention having the above-mentioned structure will be explained in the following. In the first place, the first picture board 1 is displayed through the picture window 4*a*, where the recorded voice and sound on the first record track corresponding to the first picture are reproduced by the playback head 10. When the tape 3 makes a round, the playback with regard to the first picture board 1 will be completed, then the first picture board 1 is drawn out from the side of the picture casing 4. When the first picture board 1 is drawn out, the stopper 8 is moved to the right (FIG. 4) as far as the distance S because the guide member is pulled by the coil spring 9, whereby the stopper 8 engages the second stopper surface 2'a of the second picture board 1' and is stopped there. When the guide member 5 is moved to the right in FIG. 2 as far as a distance S, the support leg 12 is moved from the uppermost step 5*a* to the next step as the support plate 11 is pushed down by the coil spring 15, so that the playback head 10 is also shifted to the second record track of the tape 3 to reproduce the second record which corresponds to the second picture on the picture board 1'. After the second recorded sound is reproduced completely, the second picture board 1' is drawn out from the picture casing 4, whereby the guide member 5 is moved together with the stopper 8 in like manner as the foregoing explanation, so that the support plate 11 is lowered by the step down of the support leg 12, and the playback head 10 is shifted to the next record track of the tape 3. Accordingly, the sound with regard to the third picture board is then reproduced during the displaying of the third picture board 1''. In like manner as the above, the operation of the device may be continued until the last picture is displayed.

when the story comes to an end, the reproducing device of the cartridge tape is stopped, then the set of picture boards 1, 1', 1'', 1''' . . . is inserted again into the picture casing 4, where the stopper 8 and the guide member 5 are pushed back against the force of the coil spring 9, at the same time, the sliding surface 12*a* of support leg 12 on the lowermost step is slid up on the inclined surfaces 5*d*, rounded surfaces *e* of the edges and steps 5*a* to the uppermost step 5*a*, whereby the synchronizing device of the invention is ready for the next display of the picture-story show.

In the above-disclosed embodiment, the set of picture boards comprises eight pictures, accordingly the numbers of the record tracks of cartridge tape and steps of guide member are eight, respectively. These numbers, however, may be changed in compliance with the story. Further, in the above embodiment, the picture boards are drawn out from the right side of the picture casing 4. However, it can be changed to draw out the picture boards from the left side without departing from the scope of the present invention, in which the guide members and other parts may be attached to the opposite side.

As explained in the above, by drawing out the picture boards one by one, the contact position of the stopper surface of the picture board and the stopper of guide member is changed at the same time the guide member is moved, and the support leg is lowered to the lower step of the guide member, whereby the playback head can be moved correctly to the next record track of the record tape while keeping the playback head in an accurately vertical magnetic contact with the tape. The voices and sounds accorded with the displayed picture can be reproduced automatically. Therefore the effect of the picture-story show does not depend upon the skill of story teller. In addition to that, any of background sounds and music can be reproduced together with voices to give excellent show effect.

Further, the support plate is held by the support post attached to the bed being imparted with downward pressure of the coil spring. The supporting leg of the plate is placed on a step of the guide member. Therefore, the playback head can be moved against the record tracks of the record tape with accurate and stable condition and the vertical positioning of the head can be always accurate. Also, in the ascending of the support leg on the steps, the playback head can be smoothly raised as the support plate is held by means of the coil spring. Still further, the playback head can be moved to the proper position of the record track without delay when the picture board is drawn out and the guide member is moved.

Furthermore, the distance of movement of the playback head between each record track of the cartridge tape is caused to coincide with the height of each step of the guide member, and the depth to the stopper surface of the corner cut of picture board is increased board by broad by a certain length, in which the length of each increase is caused to coincide with each pitch of the step of guide member in horizontal direction. Accordingly, the movement of the playback head can be carried out correctly throughout a long period of use. Still more, the lowermost end of the support leg is provided with a rounded sliding surface, and the edge portions of steps of the guide member are also provided with rounded surfaces, such that the sliding of the support leg against the steps of the guide member can be carried out smoothly. Accordingly, the insertion of the picture boards into the picture casing and exchange of the picture boards with another set of picture boards can be made smoothly without any trouble.

Further, the synchronizing device of the present invention is simple and durable in structure, so that it can be produced easily and inexpensively, and the mass production of this device can be surely expected. As will be understood from the above disclosure, the synchronizing device of the present invention can be advantageously used for juvenile education of sentiments, acoustics and science as well as for the interesting picture-story shows. It should be again emphasized that the above embodiment are intended as merely illustrative and in no way restrictive of the invention.

What is claimed is:

1. A device for synchronizing visual display of a plurality of picture boards with an aural program played from a tape within a cartridge, comprising:

A. said cartridge tape comprising a corresponding plurality of record tracks aligned in order of sounds and voices recorded thereon to be reproduced throughout the aural program, B. a picture casing for holding the plurality of picture boards in a predetermined display order corresponding to the order of said aural program on said plurality of record tracks and allowing sequential removal of the boards in said display order, exposing successive boards to view, C. said plurality of picure boards being provided with a corresponding plurality of corner cuts in the respective boards, each board having one cut, each cut having a different depth, the depth of said cuts increasing from board to board in said predetermined display order, said cuts forming stopper surfaces, D. a support plate having a first end and a second end, the support plate being mounted in a movable manner, E. spring means for imparting a force to the support plate in a predetermined direction to thereby tend to move the support plate in the predetermined direction, F. a playback head mounted on said first end of said support plate for movement across said record tracks when the support plate moves in the predetermined direction, G. a support leg adjustable in the predetermined direction including a first end thereof, the support leg being mounted on said second end of the support plate, H. a guide member comprising a stopper and a plurality of steps corresponding in number to the plurality of record tracks, I. means including a coil spring for pulling the guide member in a direction parallel to the picture boards until the stopper of the guide member is stopped by the stopper surface of the corner cut in the board currently positioned for display and J. means for causing said first end of the support leg to move into contact with whichever one of the plurality of steps is currently adjacent to it in accordance with the board currently positioned for display and thereby moving the support plate to cause the playback head to reproduce the corresponding record track.

2. A synchronizing device according to claim 1, wherein the support plate is held in the movable manner by a support post attached to a bed of said device, a compression spring being fitted between said support plate and a spring end plate attached at the uppermost end of said support post, said support leg being attached to said support plate with another coil spring for adjusting the height of said support plate, and the first end of said support leg being held on one of said steps of said guide member.

3. A synchronizing device according to claim 1, wherein each step of said guide member has a width which is the same as each corresponding increase between the depths of adjacent corner cuts of said picture boards, and the height of each step is the same as the corresponding distance between the adjacent record tracks of said cartridge tape.

4. A synchronizing device according to claim 1, wherein said support leg of said support plate is provided with a round first end, and the edges of said steps of said guide member are provided with rounded edge surfaces so as to cause smooth movement of said support leg along said steps when the picture boards are drawn out from or inserted into said picture casing.

5. A device for synchronizing visual display of a plurality of picture boards with an aural program played from a cartridge tape, comprising:

A. a plurality of record tracks on the cartridge tape, each of the tracks being recorded with material appropriate for playback with the display of a corresponding picture board, B. a picture casing for holding the plurality of picture boards, for displaying the boards one at a time, and for allowing the boards to be inserted and removed therefrom, C. a stopper surface cut into each of the boards, the depth of the cut differing in each board and increasing in depth from the first board to be displayed to the last board to be displayed, and D. guide means for feeling the depth of the shallowest cut in a board in the casing and for causing the playback of the one of the plurality of tracks containing material appropriate for playback with the board having the shallowest cut.

* * * * *